(12) United States Patent
Nyborg et al.

(10) Patent No.: US 8,793,027 B2
(45) Date of Patent: Jul. 29, 2014

(54) POWER CURTAILMENT OF WIND TURBINES

(75) Inventors: Anders Nyborg, Arhus (DK); Søren Dalsgaard, Hadsten (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 12/669,131

(22) PCT Filed: Jun. 23, 2009

(86) PCT No.: PCT/EP2009/057801
§ 371 (c)(1),
(2), (4) Date: Apr. 5, 2010

(87) PCT Pub. No.: WO2010/000648
PCT Pub. Date: Jan. 7, 2010

(65) Prior Publication Data
US 2010/0286835 A1 Nov. 11, 2010

Related U.S. Application Data

(60) Provisional application No. 61/133,693, filed on Jun. 30, 2008.

(30) Foreign Application Priority Data

Jun. 30, 2008 (DK) .................. 2008 00901

(51) Int. Cl.
*H02P 9/04* (2006.01)
*G06F 1/26* (2006.01)

(52) U.S. Cl.
USPC ........... 700/287; 700/295; 700/297; 700/286; 700/296; 290/44; 290/55; 416/104; 322/44

(58) Field of Classification Search
USPC ...................... 700/287, 295; 290/44; 416/104
See application file for complete search history.

(56) References Cited

U.S. PATENT DOCUMENTS 4,160,170 A * 7/1979 Harner et al. .................. 290/44
4,656,362 A * 4/1987 Harner et al. .................. 290/44
(Continued)

FOREIGN PATENT DOCUMENTS

DE       10300733 B3     7/2004
DE       19532409 B4     5/2005
(Continued)

OTHER PUBLICATIONS

Hansen et al, "Centralised power control of wind farm with doubly fed induction generators", Renewable Energy, Pergamon Press 2006, pp. 931-956.*

(Continued)

Primary Examiner — Kavita Padmanabhan
Assistant Examiner — Olvin Lopez Alvarez
(74) Attorney, Agent, or Firm — Patterson & Sheridan, LLP

(57) ABSTRACT

The present invention relates to a method for curtailing electrical power supplied from a wind turbine or a group of wind turbines to an associated power supply grid, the method comprising the steps of determining an available electrical power level from the wind turbine facility and setting a wind speed independent curtailment level. The curtailment level may be a percentage of an actual available electrical power level or a fixed power level. The method further comprises the step of operating the wind turbine facility in such a way that the generated electrical power supplied from the wind turbine facility equals the difference between an actual available electrical power level and the curtailment level. The present invention further relates to a wind turbine facility and a curtailing controller for carrying out the invention.

16 Claims, 3 Drawing Sheets

(56) References Cited

U.S. PATENT DOCUMENTS

| | | | | |
|---|---|---|---|---|
| 4,703,189 | A * | 10/1987 | DiValentin et al. | 290/44 |
| 6,320,272 | B1 * | 11/2001 | Lading et al. | 290/44 |
| 6,724,097 | B1 | 4/2004 | Wobben | |
| 6,809,431 | B1 | 10/2004 | Schippmann | |
| 7,317,260 | B2 * | 1/2008 | Wilson | 290/44 |
| 7,372,173 | B2 * | 5/2008 | Lutze et al. | 290/44 |
| 7,392,114 | B2 * | 6/2008 | Wobben | 700/286 |
| 7,420,289 | B2 * | 9/2008 | Wang et al. | 290/44 |
| 7,528,496 | B2 * | 5/2009 | Fortmann | 290/44 |
| 7,531,911 | B2 * | 5/2009 | Rivas et al. | 290/44 |
| 7,633,176 | B1 * | 12/2009 | Blittersdorf | 290/44 |
| 7,763,989 | B2 * | 7/2010 | Kinzie et al. | 290/44 |
| 7,874,797 | B2 * | 1/2011 | Pierce et al. | 416/1 |
| 7,898,100 | B2 * | 3/2011 | Andersen et al. | 290/44 |
| 8,116,914 | B2 * | 2/2012 | Oohara et al. | 700/287 |
| 8,174,136 | B2 * | 5/2012 | Johnson et al. | 290/44 |
| 2005/0042098 | A1 | 2/2005 | Wobben | |
| 2005/0146141 | A1 * | 7/2005 | Basteck | 290/44 |
| 2006/0142899 | A1 * | 6/2006 | Wobben | 700/286 |
| 2006/0147307 | A1 | 7/2006 | Steudel | |
| 2007/0154311 | A1 | 7/2007 | Kabatzke et al. | |
| 2007/0205602 | A1 * | 9/2007 | Willey et al. | 290/44 |
| 2008/0042442 | A1 | 2/2008 | Richter et al. | |
| 2008/0116690 | A1 * | 5/2008 | Kabatzke et al. | 290/44 |
| 2008/0150283 | A1 | 6/2008 | Rivas et al. | |
| 2009/0055030 | A1 * | 2/2009 | Mayor et al. | 700/287 |
| 2009/0212563 | A1 * | 8/2009 | Morjaria | 290/44 |
| 2009/0295159 | A1 * | 12/2009 | Johnson et al. | 290/44 |
| 2010/0138058 | A1 * | 6/2010 | Kirchner et al. | 700/286 |
| 2010/0259102 | A1 * | 10/2010 | Guelbenzu Michelena et al. | 307/65 |
| 2011/0182712 | A1 * | 7/2011 | Nayebi et al. | 415/15 |
| 2011/0204635 | A1 * | 8/2011 | Miller | 290/44 |
| 2013/0140819 | A1 * | 6/2013 | Abdallah et al. | 290/44 |

FOREIGN PATENT DOCUMENTS

| | | |
|---|---|---|
| DE | 102005052011 A1 | 5/2007 |
| DE | 102006039693 A1 | 3/2008 |
| EP | 0947042 B1 | 10/2001 |
| EP | 1125060 B1 | 7/2002 |
| EP | 1467463 A1 | 10/2004 |
| EP | 1790851 A2 | 5/2007 |
| EP | 1850002 A1 | 10/2007 |
| WO | 9933165 A1 | 7/1999 |
| WO | 0077395 A1 | 12/2000 |
| WO | 0102723 A1 | 1/2001 |
| WO | 0125630 A1 | 4/2001 |
| WO | 0186143 A1 | 11/2001 |
| WO | 02086314 A1 | 10/2002 |
| WO | 03030329 A1 | 4/2003 |
| WO | 2005025026 A1 | 3/2005 |
| WO | 2010000648 A2 | 1/2010 |

OTHER PUBLICATIONS

Lubosny et al, Supervisory control of a Wind Farm, 2007, IEEE, pp. 985-994.*

Free Online Dictionary, "definition of :curtailment", downloaded 2011, pp. 2.*

David Richardson et al, "Wind Energy Systems", Mar. 1993, IEEE. pp. 378-389.*

Gary L. Johnson, "Wind Energy Systems", Nov. 21 2001, pp. 4.1-4.54.*

Tarnowski et al, "Regulation and Frequency Response Service Capability of Modern Wind Power Plants", Jul. 29, 2010, IEEE, pp. 1-8.*

Sorensen et al, "Wind farm models and control strategies", Aug. 2005, pp. 63.*

Tsili et al "Grid code requirements for large wind farms: A review of technical regulations and available wind turbine technologies," in Proceedings of the EWEC, Apr. 2008, pp. 1-11.*

Ramtharan et al, "Frequency support from doubly fed induction generator wind turbines", Mar. 2007, pp. 3-9.*

Singh et al, "Wind power interconnection into the power system: A Review of Grid Code Requirements", Elsevier The Electricity Journal, vol. 22, No. 5, pp. 54-63, Jun. 2009.*

EirGrid "Eirgride Grid Code, Version 3.3", 2009, pp. 26.*

Rose et al, "The Cost of Curtailing Wind Turbines for Frequency Regulation and Ramp-Rate Limitation", Oct. 2010, pp. 1-18.*

Denmark Patent Office, Preliminary Examination of related Denmark Patent Application No. Pa 2008 00901 dated Dec. 12, 2008.

Sørensen, Poul et al., Wind farm models and control strategies, Risø National Laboratory, Aug. 2005, Roskilde, Denmark, pp. 63.

Sørensen, Poul et al., Modeling of wind farm controllers, Risø National Laboratory, Roskilde, Denmark, pp. 9.

Boeda, D., et al., Contribution of Wind Farms to Frequency Control and Network Stability, European Wind Energy Conference, 2007, France, pp. 1-10.

Almeida, Rogerio G. de et al., Participation of Doubly Fed Induction Wind Generators in System Frequency Regulation, IEEE Transactions on Power Systems, vol. 22, No. 3, Aug. 2007, Piscataway, United States, pp. 944-950.

Courtecuisse, Vincent, Capacity of a variable speed turbine to participate in primary frequency control, Sixth International Workshop on Large-Scale Integration of Wind Power and Transmission Networks for Offshore Wind Farms, Oct. 2006, Aarhus, Denmark, pp. 201-210.

Ramtharan, G. et al., Frequency support from doubly fed induction generator wind turbines, Renewable Power Generation, vol. 1, Issue 1, Mar. 2007, Stevenage, United Kingdom, pp. 3-9.

Lubosny, Zbigniew et al., Supervisory Control of a Wind Farm, IEEE Transactions on Power Systems, vol. 22, Issue 3, Aug. 2007, Piscataway, United States, pp. 985-994.

Lebioda, A., et al., Investigation of Disposable Reserve Power in a Large-Scale Wind Farm, Power Tech, Jun. 2005, Piscataway, United States, pp. 1-6.

Hansen, Anca D. et al., Centralized power control of wind farm with doubly fed induction generators, Risø National Laboratory, 2005, Roskilde, Denmark, pp. 935-951.

Wind Turbines Connected to Grids with Voltages above 100 kv: Technical regulation for the properties and the regulation of wind turbines, Elkraft System and Eltra, Nov. 2004, Erritsø, Denmark, pp. 34.

Hau, Erich, Aerodynamic Power Control, Rotor Aerodynamics, Wind-turbines: Fundamental, Technologies, Application, Economics, 2000, pp. 80-91, Springer, Berlin, Germany, pp. 8.

Prillwitz, Dr. Fred et al., Primarregelung mit Windkraftanlagen, (Abstract only), Feb. 2003, University of Rostock, Rostock, Germany, pp. 7.

* cited by examiner

POWER CURTAILMENT OF WIND TURBINES

FIELD OF THE INVENTION

The present invention relates to power curtailment of wind turbines or wind turbine farms. In particular, the present invention relates to a method and a wind turbine facility capable of being operated in a curtailed power operational mode. By applying power curtailment of wind turbine facilities grid code demands regarding fast and effective grid frequency control can be complied with.

BACKGROUND OF THE INVENTION

When operating a wind turbine or a wind farm it is aimed to obtain maximum yield of the capital invested in it. In order to comply with this wind turbine control systems are configured to maximise the output power.

One way of controlling the performance of a wind turbine is to pitch the rotor blades of the wind turbine. Such rotor blade pitching can for example be managed by an electrically or a hydraulically driven blade pitching system.

The modes of operation of a wind turbine can be divided in two parts:
1. partial load operation in wind speeds between a few m/s and nominal wind speed, and
2. full load operation in wind speeds between nominal speed wind and shut down speed wind.

It is known that controlling the rotor blade pitch provides effective means for controlling the wind turbine performance in the nominal wind speed operation in order to keep the rotor speed of the wind turbine as constant as possible around a nominal rotor speed.

If a power buffer on each wind turbine is required the nominal power set point of the turbine can be reduced. However, in partial load operation the wind turbine will still seek at producing maximum power of the available wind with the result that the required power buffer is no longer available. Thus, reducing the wind turbine nominal set point does not provide the required power buffer in partial load operation.

As an example, if a 3 MW wind turbine is derated to 2.5 MW in order to create a 500 kW buffer this will have no effect if the wind is only allows 1 MW production: Thus, the 500 kW buffer is not available. In other words, according to known control schemes it is not possible, in partial load operation, to ensure that the wind turbine production is lower than what the wind turbine can produce at the actual wind speed conditions. The only way to reduce the power production at low wind speeds is to switch the wind turbine into a nominal power control algorithm which includes that a reduced power set point is provides to the wind turbine. The reduced power set point ensures that the power production is lowered with the desired amount.

It may be seen as an object of embodiments of the present invention to provide a method and an arrangement to facilitate fast and effective grid frequency control in particular in partial load operation.

DESCRIPTION OF THE INVENTION

The above-mentioned object is complied with by providing, in a first aspect, a method for curtailing electrical power supplied from a wind turbine facility to an associated power supply grid, the method comprising the steps of determining an available electrical power level from the wind turbine facility, setting a wind speed independent curtailment level for the wind turbine facility, and operating the wind turbine facility in such a way that the generated electrical power supplied from the wind turbine facility equals the difference between an actual available electrical power level and the curtailment level.

The term wind turbine facility should be interpreted broadly. Thus, the term wind turbine facility covers a single wind turbine or a group of wind turbines forming a wind turbine farm.

Also, by available electrical power is meant the possible power production which could have be obtained if the turbine was allowed to operate at optimum conditions.

The available electrical power level is determined under given current operation conditions and it may be determined in various ways. One way of determining the available electrical power level is based on a measurement of the actual wind speed.

The curtailment level may be set as a percentage of the available electrical power level. In principle the curtailment level may be any percentage between 0% and 100% of the available electrical power level. Thus, the curtailment level may be smaller than 40%, such as smaller than 30%, such as smaller than 20%, such as smaller than 10%, of the available electrical power level.

Alternatively, the curtailment level may be set as a fixed power level. As an example, the curtailment level for a 3 MW wind turbine may be fixed to 500 kW.

Thus, in full load operation the wind turbine will produce 2.5 MW whereas the wind turbine in a partial load operation will produce 500 kW below the available electrical power level.

According to one embodiment of the present invention, the electrical power supplied from the wind turbine facility to the power supply grid may be curtailed by pitching at least one rotor blade, or at least one set of rotor blades, of a wind turbine a predetermined pitching angle. As previously stated, the wind turbine may be an isolated wind turbine, or it may form part of a group of wind turbines forming a wind farm. The predetermined pitching angle may be derived from the available electrical power level and the curtailment level.

According to a second embodiment, the electrical power supplied from the wind turbine facility may be curtailed by changing the speed of rotation of the rotor of the wind turbine. Thus, curtailment may be obtained by increasing or decreasing the speed of rotation of the rotor of the wind turbine. Again, the wind turbine may be an isolated wind turbine, or it may form part of a group of wind turbines forming a wind farm.

In a third embodiment, the electrical power supplied from the wind turbine facility may be curtailed by changing (increasing or decreasing) the speed of rotation of the rotor of the wind turbine, and by pitching a rotor blade or a set of rotor blades of said wind turbine a predetermined pitching angle. Again, the predetermined pitching angle may be derived from the available electrical power level and the curtailment level.

In a second aspect the present invention relates to a wind turbine facility adapted to generate and supply electrical power to an associated power supply grid, the wind turbine facility comprising a curtailment controller comprising means for determining an available electrical power level from the wind turbine facility, and means for storing a set wind speed independent curtailment level for the wind turbine facility, wherein the curtailment controller is adapted to operate the wind turbine facility in such a way that the electrical power supplied from the wind turbine facility equals the difference between an actual available electrical power level and the curtailment level.

Again, the term wind turbine facility should be interpreted broadly. Thus, the term wind turbine facility covers a single wind turbine or a group of wind turbines forming a wind turbine farm. The wind turbine or wind turbines may comprise a doubly-fed induction generator for generating a three-phase AC power output.

The provided means for determining the available electrical power level may be comprise a wind speed sensor.

The set curtailment level may be a percentage between 0% and 100% of the available electrical power level. As an example, the curtailment level may be smaller than 40%, such as smaller than 30%, such as smaller than 20%, such as smaller than 10%, of the available electrical power level. Alternatively, the curtailment level may be set as a fixed power level. As an example, the curtailment level for a 3 MW wind turbine may be fixed to 500 kW. Thus, in full load operation the wind turbine will produce 2.5 MW whereas the wind turbine in a partial load operation will produce 500 kW below the available electrical power level.

In order to operate the wind turbine facility in a curtailed mode of operation, the wind turbine facility may further comprise an arrangement for pitching at least one rotor blade of a wind turbine a predetermined pitching angle in order to comply with the set curtailment level.

The curtailment controller may be adapted to derive the predetermined pitching angle from the available electrical power level and the curtailment level.

The wind turbine facility may further comprise an arrangement for changing (increasing or decreasing) the speed of rotation of the rotor of a wind turbine in order to comply with the set curtailment level.

In a third aspect the present invention relates to a curtailment controller for a wind turbine facility comprising means for determining an available electrical power level from the wind turbine facility, and means for storing a set wind speed independent curtailment level for the wind turbine facility, wherein the curtailment controller is adapted to operate the wind turbine facility in such a way that the electrical power supplied from the wind turbine facility equals the difference between an actual available electrical power level and the curtailment level.

Again, the curtailment level may be a percentage of an actual available electrical power level or a fixed power level.

The curtailment controller may be implemented following the design route set forth in connection with the second aspect of the present invention.

In a fourth aspect the present invention relates to a computer program product for carrying out the method according to the first aspect of the present invention when said computer program product is run on a computer.

In a fifth aspect the present invention relates to a data carrier comprising a computer program product for carrying out the method according to the first aspect of the present invention when said computer program product is run on a computer.

BRIEF DESCRIPTION OF THE DRAWINGS

Various aspects and embodiments of the present embodiments of the present invention will now be described in connection with the accompanying drawings, in which.

Figure 1:
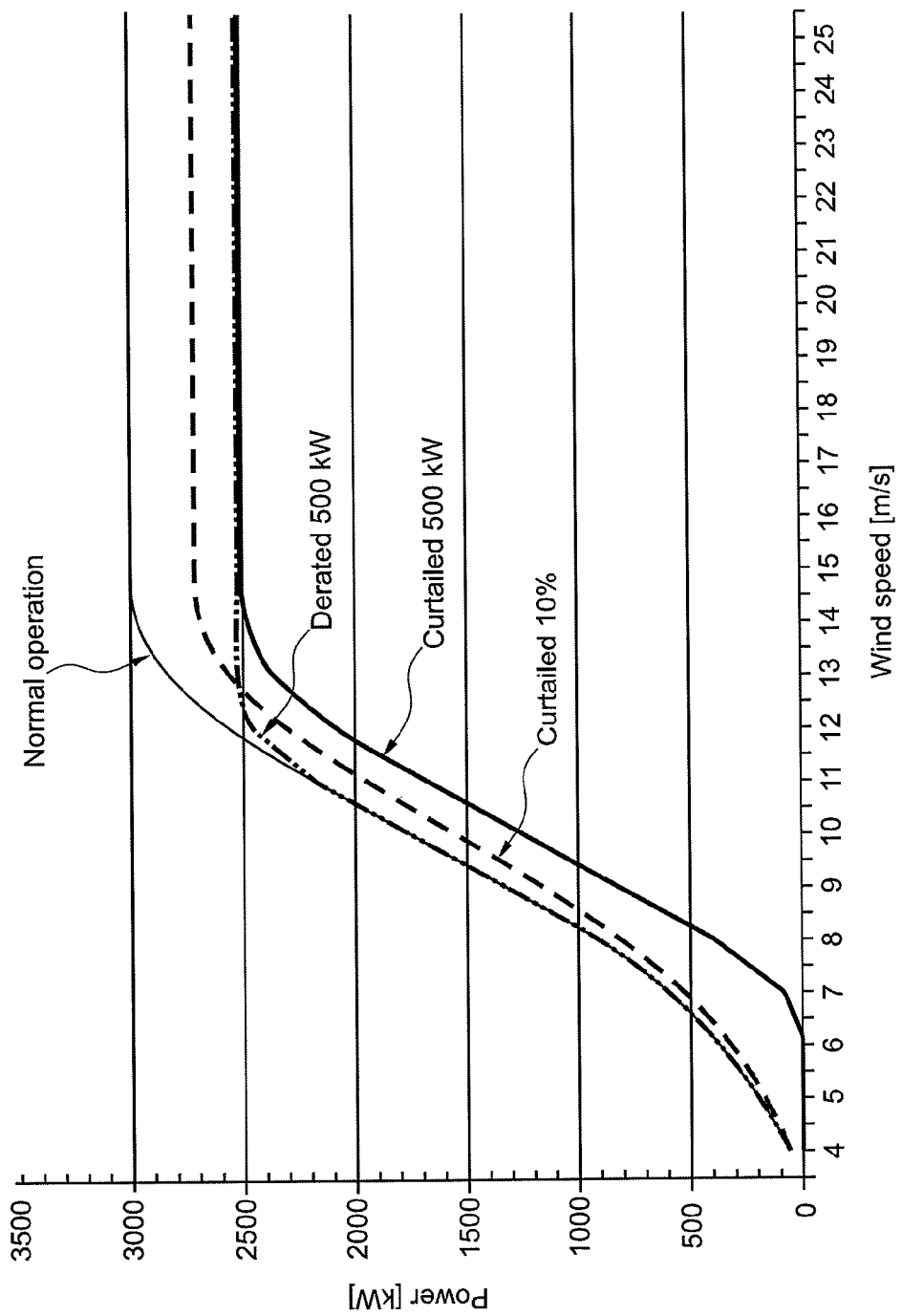
FIG. 1 illustrates idealized power curves of a normal, a curtailed and a derated wind turbine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

Generally, the present invention originates from the observation that there is an increasing demand for wind turbine or wind farm reaction when a grid frequency deviates from a nominal grid frequency.

According to the present invention, it is possible to operate a wind turbine or wind farm at power levels being lower than maximum output power in both partial and full load conditions. This is accomplished by establishing a power buffer to the power coefficient required. This power buffer is advantageously available in the partial load range and in the nominal power output range depending on the wind speed.

In order to understand some of the operation modes and parameters for grid frequency control the difference between power derate and power curtailment must be clear. Power curtailment reduces the turbine grid power by a specified power level (below available power). This specified power level can be a fixed power level, such as for example 500 kW, or it can be a percentage, such as for example 10%, of the available power. Power curtailment differs from power derating only in partial load operation because a derated wind turbine generates the same amount of power (optimum power) as a non-derated turbine in partial load operation. Contrary to this a curtailed wind turbine generates a power level being smaller than the available power level at all wind speeds. Hence a 10% curtailed wind turbine generates 90% of what is possible both in partial load operation and full load operation.

FIG. 1 illustrates idealized power curves of a curtailed and a derated wind turbine. Note that a curtailed wind turbine will switch to full load at the same wind speed as a non-curtailed turbine. A derated turbine switches to full load at a lower wind speed.

As generally known wind turbines include a control system that controls and operates different internal features of the wind turbine.

Figure 2:
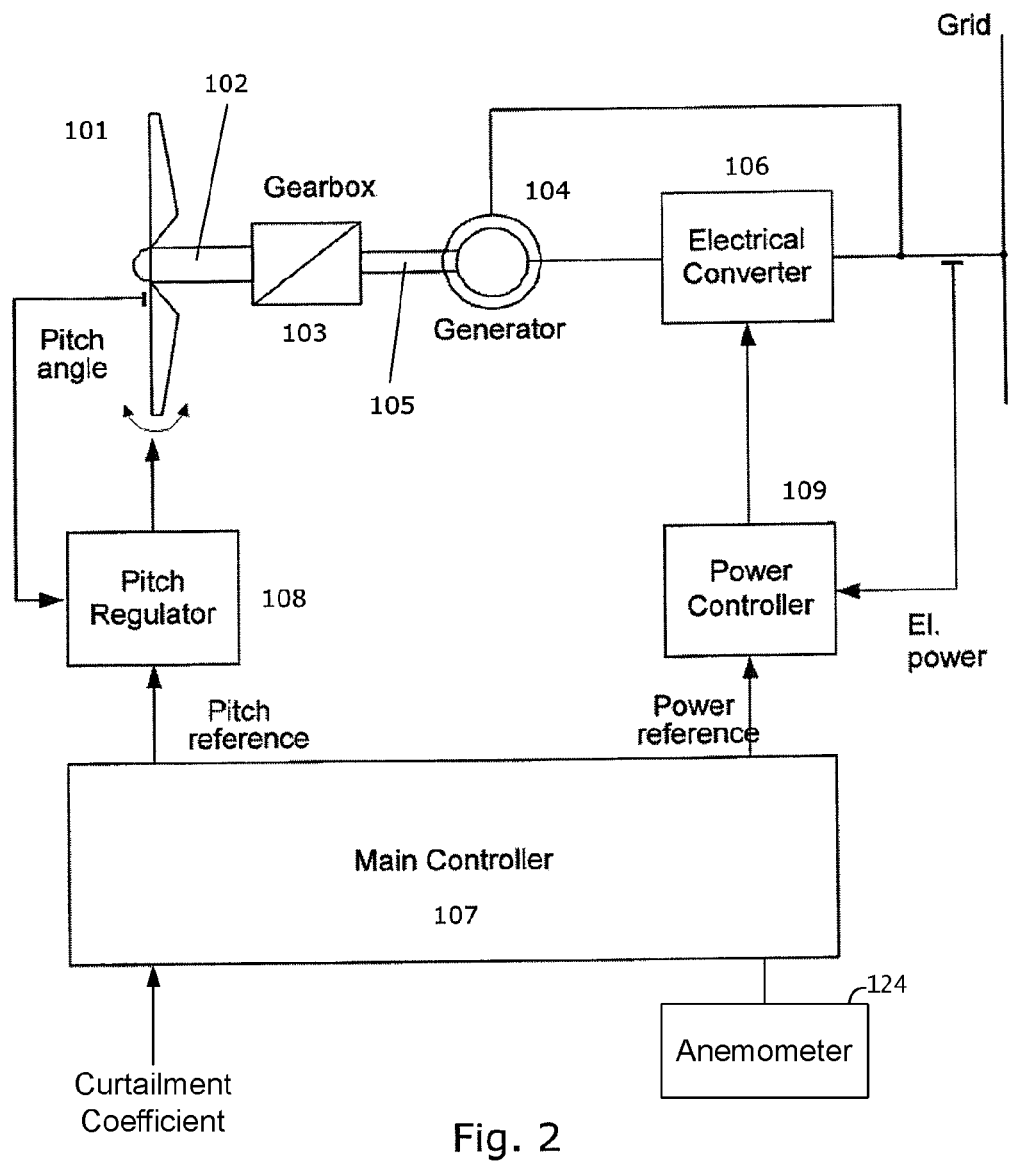
FIG. 2 shows a schematic diagram of a turbine control system.

FIG. 2 depicts one possible control system and its interaction with a wind turbine 100 that is only partially and schematically drawn. Rotor blades 101 are rotated by the wind. The rotor blades 101 are mechanically connected to the gearbox 103 via shaft 102. The gearbox 103 is mechanically connected to an electrical generator 104 via shaft 105.

The electrical power generated by the generator 104 is launched into an associated power grid via an electrical converter 106. The electrical generator 104 can be a doubly fed induction generator.

A main controller 107, comprising a main processor, controls the overall control functions of the turbine, notably a pitch controller 108 using a pitch reference, and a power controller 109 using the power reference.

As stated previously one of the embodiments of this present invention relates to a method for curtailing the power generated by the wind turbine 100. This method is concerned with operating the wind turbine 100 below its maximum possible power at a given wind speed in order to establish a power buffer or power reserve that can be supplied to the power grid if demands to require. Thus, by providing this power buffer the wind turbine power production can be increased when needed—for example in case of an increased power demand or in case of a decrease in the grid frequency.

During normal operation, wind turbine rotor blades are pitching at an optimal pitching angle. The optimal pitching angle is defined as the blade angle that takes the maximum power out of the wind.

In order to be able to provide more power to the grid if needed, the main controller 107 managing the overall control receives a value representing the wind speed from for example an anemometer 124. This value can be provided for example 10 times per second and the pitching angle of the rotor blades are adjusted accordingly.

Alternatively, the manager of the wind turbine sends (or has sent previously) to the main controller 107 a curtailment coefficient which is an aerodynamic efficiency. The curtailment coefficient is defined as the ratio between the actual power generated by the wind turbine at a given wind and the power that is extracted from the wind by the wind turbine rotor.

The curtailment coefficient could be for example 90% or 85% yielding a power buffer of 10% or 15%, respectively.

The main controller 107 calculates a pitch offset that corresponds to the curtailment coefficient required and sends a calculated pitch reference (including the pitch offset) to the pitch controller 108 in order to add the pitch offset to the optimal pitch angle.

In a particular embodiment, by way of example, if a 10% curtailment of a wind turbine is wanted, the wind turbine nominal power set point is first lowered by 10%. Then, in order to get a 10% curtailment in partial load, a pitch offset depending on the measured wind speed is calculated and added to a calculated optimal pitch angle which also depends on the wind speed. This pitch offset, which can be positive or negative, is calculated in such a manner that it exactly reduces the power production by 10%. At any time, more power can be delivered to the grid by pitching reducing the pitch offset.

The above-mentioned power curtailment/reduction is obtained by calculating the reduction in aerodynamic efficiency (Cp) that would give the desired reduction in power production. This calculation should take mechanical, electrical and various other power losses (in the path from extraction power from the wind and deliver it to the power grid) into consideration.

In another embodiment, the same reduction of Cp can be obtained by changing the generator speed reference. However, this speed is often more constrained than the pitch (e.g. due to generator and/or converter considerations). In yet another embodiment, a combination of pitch offsetting and changing generator speed reference can be used.

Figure 3:
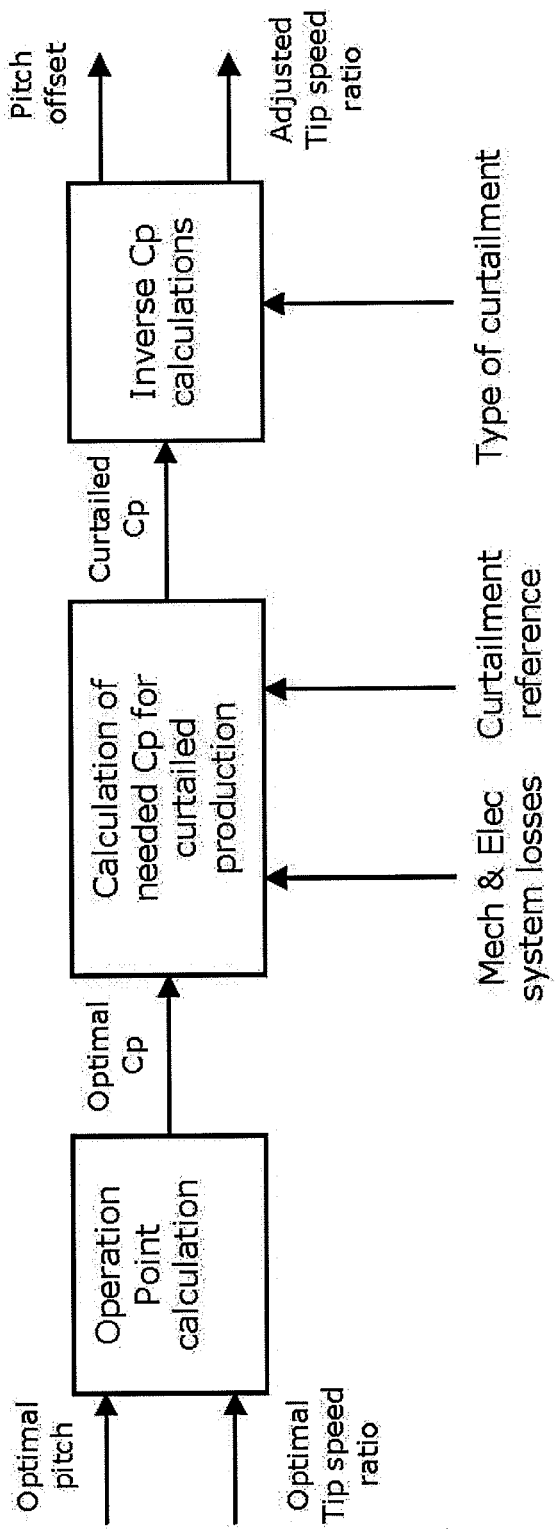
FIG. 3 shows a schematic diagram of the calculation of the rotor pitch adjustment from a calculation of the rotor aerodynamic efficiency (cp).

FIG. 3 shows a schematic depiction of a method for calculating the rotor aerodynamic efficiency, Cp, according to one embodiment of the present invention. Thus, other calculation schemes may also be applicable.

According to FIG. 3 the calculation of Cp starts by providing representatives of the optimal pitch angle and the optimal tip speed ratio—the latter being the ratio between the speed of the blade tip and the speed of the wind. Knowing the current wind speed, the optimal aerodynamic efficiency, Optimal Cp, can be calculated. The Optimal Cp is then recalculated by taking the curtailment reference and the electrical and mechanical losses of the system into consideration. The result of this recalculation is the aerodynamic efficiency, Curtailed Cp. As previously stated, the curtailment reference can represent a percentage of an actual available electrical power level or it can represent a fixed power level. Now knowing Curtailed Cp a reverse calculation resulting in a pitch offset and an adjusted tip speed ratio is performed. The pitch offset and the adjusted tip speed ratio can be directly applied to pitch the rotor blades or to change the rotor speed, respectively.

The invention claimed is:

1. A method for curtailing electrical power supplied from a wind turbine, the method comprising:
   determining an available electrical power level from the wind turbine under an optimum condition at a given wind speed and determining an optimal blade pitch angle for blades of a rotor of the wind turbine, wherein the optimal blade pitch angle corresponds to an optimal aerodynamic efficiency for the rotor at which the available electrical power level from the wind turbine is produced;
   setting a curtailment level for the wind turbine equal to a fixed power level that is independent of wind speed and determining a curtailed aerodynamic efficiency of the rotor at which the wind turbine generates electrical power equal to the difference between the available electrical power level and the curtailment level at the given wind speed;
   determining a blade pitch angle offset from the determined curtailed aerodynamic efficiency of the rotor, and wherein the determined curtailed aerodynamic efficiency is determined based on the optimal pitch angle; and
   adjusting the blade pitch angle of the blades of the rotor to an angle corresponding to the determined blade pitch angle offset so that the generated electrical power supplied from the wind turbine equals a difference between the available electrical power level and the curtailment level at the given wind speed.

2. The method of claim 1, wherein the electrical power supplied from the wind turbine is curtailed by changing a speed of rotation of the rotor of the wind turbine.

3. The method of claim 1, wherein the electrical power supplied from the wind turbine is curtailed by changing a speed of rotation of the rotor of the wind turbine, and by pitching one or more rotor blades of the wind turbine by a predetermined pitching angle.

4. The method of claim 1, wherein the wind turbine is one of a plurality of wind turbines comprising a wind turbine park.

5. The method of claim 1 wherein the wind turbine is operated so that the generated electrical power supplied from the wind turbine equals the difference between the available electrical power level and the curtailment level at all power-producing wind speeds.

6. A wind turbine adapted to generate and supply electrical power to an associated power supply grid, the wind turbine comprising:
   a rotor including at least one rotor blade;
   a curtailment controller configured to:
      determine an available electrical power level from the wind turbine under an optimum condition at a given wind speed;
      determine an optimal blade pitch angle for the at least one blade of the rotor, wherein the optimal blade pitch angle corresponds to an optimal aerodynamic efficiency for the rotor at which the available electrical power level is produced;
to receive or calculate a curtailment level equal to a fixed power level that is independent of wind speed for the wind turbine;
determine a curtailed aerodynamic efficiency of the rotor at which the wind turbine generates electrical power equal to the difference between the available electrical power level and the curtailment level at the given wind speed; and
determine a blade pitch angle offset from the determined curtailed aerodynamic efficiency of the rotor, and wherein the determined curtailed aerodynamic efficiency is determined based on the optimal pitch angle;
an arrangement for pitching the at least one rotor blade by a predetermined pitching angle corresponding to the determined blade pitch angle offset in order to comply with the curtailment level,
wherein the curtailment controller is further configured to operate the wind turbine so that the generated electrical power supplied from the wind turbine equals a difference between the available electrical power level and the curtailment level.

7. The wind turbine of claim 6, further comprising:
an arrangement for changing a speed of rotation of the rotor in order to comply with the curtailment level.

8. The wind turbine of claim 6 wherein the curtailment controller is configured to operate the wind turbine so that the generated electrical power supplied from the wind turbine equals the difference between the available electrical power level and the curtailment level at all power-producing wind speeds.

9. A non-transitory data carrier comprising a computer program product that, when run on a computer, causes the computer to:
determine an available electrical power level from a wind turbine under an optimum condition at a given wind speed and determine an optimal blade pitch angle for blades of a rotor of the wind turbine, wherein the optimal blade pitch angle corresponds to an optimal aerodynamic efficiency for the rotor at which the available electrical power level from the wind turbine is produced;
set a curtailment level for the wind turbine equal to a fixed power level that is independent of wind speed and determining a curtailed aerodynamic efficiency of the rotor at which the wind turbine generates electrical power equal to the difference between the available electrical power level and the curtailment level at the given wind speed;
determining a blade pitch angle offset from the determined curtailed aerodynamic efficiency of the rotor, and wherein the determined curtailed aerodynamic efficiency is determined based on the optimal pitch angle; and
adjust the blade pitch angle of the blades of the rotor to an angle corresponding to the determined blade pitch angle offset so that the generated electrical power supplied from the wind turbine equals a difference between the available electrical power level and the curtailment level.

10. A method for curtailing electrical power supplied from a wind turbine, the method comprising:
determining an available electrical power level from the wind turbine under optimum operating conditions at a given wind speed and determining an optimal blade pitch angle for blades of a rotor of the wind turbine, wherein the optimal blade pitch angle corresponds to an optimal aerodynamic efficiency for the rotor at which the available electrical power level from the wind turbine is produced;
setting a curtailment level for the wind turbine equal to a fixed percentage of the available electrical power level, wherein the fixed percentage is independent of the given wind speed and determining a curtailed aerodynamic efficiency of the rotor at which the wind turbine generates electrical power equal to the difference between the available electrical power level and the curtailment level at the given wind speed;
determining a blade pitch angle offset from the determined curtailed aerodynamic efficiency of the rotor, and wherein the determined curtailed aerodynamic efficiency is determined based on the optimal pitch angle;
adjusting the blade pitch angle of the blades of the rotor to an angle corresponding to the determined blade pitch angle offset so that the generated electrical power supplied from the wind turbine equals a difference between the available electrical power level and the curtailment level at the given wind speed.

11. The method of claim 10 wherein the electrical power supplied from the wind turbine is curtailed by changing a speed of rotation of the rotor of the wind turbine.

12. The method of claim 10 wherein the electrical power supplied from the wind turbine is curtailed by changing a speed of rotation of the rotor of the wind turbine, and by pitching one or more rotor blades of the wind turbine by a predetermined pitching angle.

13. The method of claim 10, wherein the wind turbine is one of a plurality of wind turbines comprising a wind turbine park.

14. The method of claim 10 wherein the wind turbine is operated so that the generated electrical power supplied from the wind turbine equals the difference between the actual available electrical power level and the curtailment level at all power-producing wind speeds.

15. A wind turbine adapted to generate and supply electrical power to an associated power supply grid, the wind turbine comprising:
a curtailment controller configured to:
determine an available electrical power level from the wind turbine under an optimum condition at a given wind speed;
determine an optimal blade pitch angle for the at least one blade of the rotor, wherein the optimal blade pitch angle corresponds to an optimal aerodynamic efficiency for the rotor at which the available electrical power level is produced;
to receive or calculate a curtailment level equal to a fixed percentage of the available electrical power level, the fixed percentage being independent of the given wind speed;
determine a curtailed aerodynamic efficiency of the rotor at which the wind turbine generates electrical power equal to the difference between the available electrical power level and the curtailment level at the given wind speed; and
determine a blade pitch angle offset from the determined curtailed aerodynamic efficiency of the rotor, and wherein the determined curtailed aerodynamic efficiency is determined based on the optimal pitch angle;
an arrangement for pitching at least one rotor blade of the wind turbine by a predetermined pitching angle corresponding to the determined blade pitch angle offset in order to comply with the curtailment level, wherein the curtailment controller is further configured to operate the wind turbine so that the generated electrical power supplied from the wind turbine equals a difference between the available electrical power level and the curtailment level at the given wind speed.

16. The wind turbine of claim 15 wherein the curtailment controller is configured to operate the wind turbine so that the generated electrical power supplied from the wind turbine equals the difference between the actual available electrical power level and the curtailment level at all power-producing wind speeds.

* * * * *